US011592565B2

(12) United States Patent
Ma et al.

(10) Patent No.: US 11,592,565 B2
(45) Date of Patent: Feb. 28, 2023

(54) FLEXIBLE MULTI-CHANNEL FUSION PERCEPTION

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/811,498

(22) Filed: Jul. 8, 2022

(65) Prior Publication Data

US 2023/0020776 A1  Jan. 19, 2023

Related U.S. Application Data

(60) Provisional application No. 63/366,738, filed on Jun. 21, 2022, provisional application No. 63/220,886, filed on Jul. 12, 2021, provisional application No. 63/219,729, filed on Jul. 8, 2021, provisional application No. 63/219,731, filed on Jul. 8, 2021.

(51) Int. Cl.
*G01S 17/86* (2020.01)
*G01S 17/89* (2020.01)
*G01S 17/931* (2020.01)
*G06V 10/80* (2022.01)

(52) U.S. Cl.
CPC .............. *G01S 17/86* (2020.01); *G01S 17/89* (2013.01); *G01S 17/931* (2020.01); *G06V 10/803* (2022.01)

(58) Field of Classification Search
CPC ........ G01S 17/86; G01S 17/89; G01S 17/931; G06V 10/803
See application file for complete search history.

(56) References Cited

U.S. PATENT DOCUMENTS 10,956,755 B2 *  3/2021  Musk .................. G06K 9/6289
11,295,469 B2 *  4/2022  Hong .................... H04N 5/247
2019/0353784 A1  11/2019  Toledano et al.
(Continued)

OTHER PUBLICATIONS

Cook et al., Real-Time Radar-Based Tracking and State Estimation of Multiple Non-Comformant Aircraft, AIAA Information Systems-AIAA Infotech@ Aerospace, Jan. 2017, 14 pages.
(Continued)

*Primary Examiner* — Bryan Bui
(74) *Attorney, Agent, or Firm* — Maschoff Brennan

(57) ABSTRACT

A method may include obtaining first sensor data from a first sensor system and second sensor data from a second sensor system. The first and the second sensor systems may capture sensor data from a total measurable world. The method may include identifying a first object included in the first sensor data and a second object included in the second sensor data and determining first parameters corresponding to the first object and second parameters corresponding to the second object. The first parameters may be compared with the second parameters and whether the first object and the second object are a same object may be determined based on the comparing the first parameters and the second parameters. Responsive to determining that the first object and the second object are the same object, a set of objects representative of objects in the total measurable world including the same object may be generated.

17 Claims, 8 Drawing Sheets

(56) References Cited

U.S. PATENT DOCUMENTS

2020/0098394 A1* 3/2020 Levinson ............... G06V 20/56
2021/0339741 A1* 11/2021 Rezvan Behbahani ......................
B60W 40/04

OTHER PUBLICATIONS

PCT International Search Report and Written Opinion issued in corresponding application No. PCT/US2022/036591, dated Oct. 11, 2022.

* cited by examiner

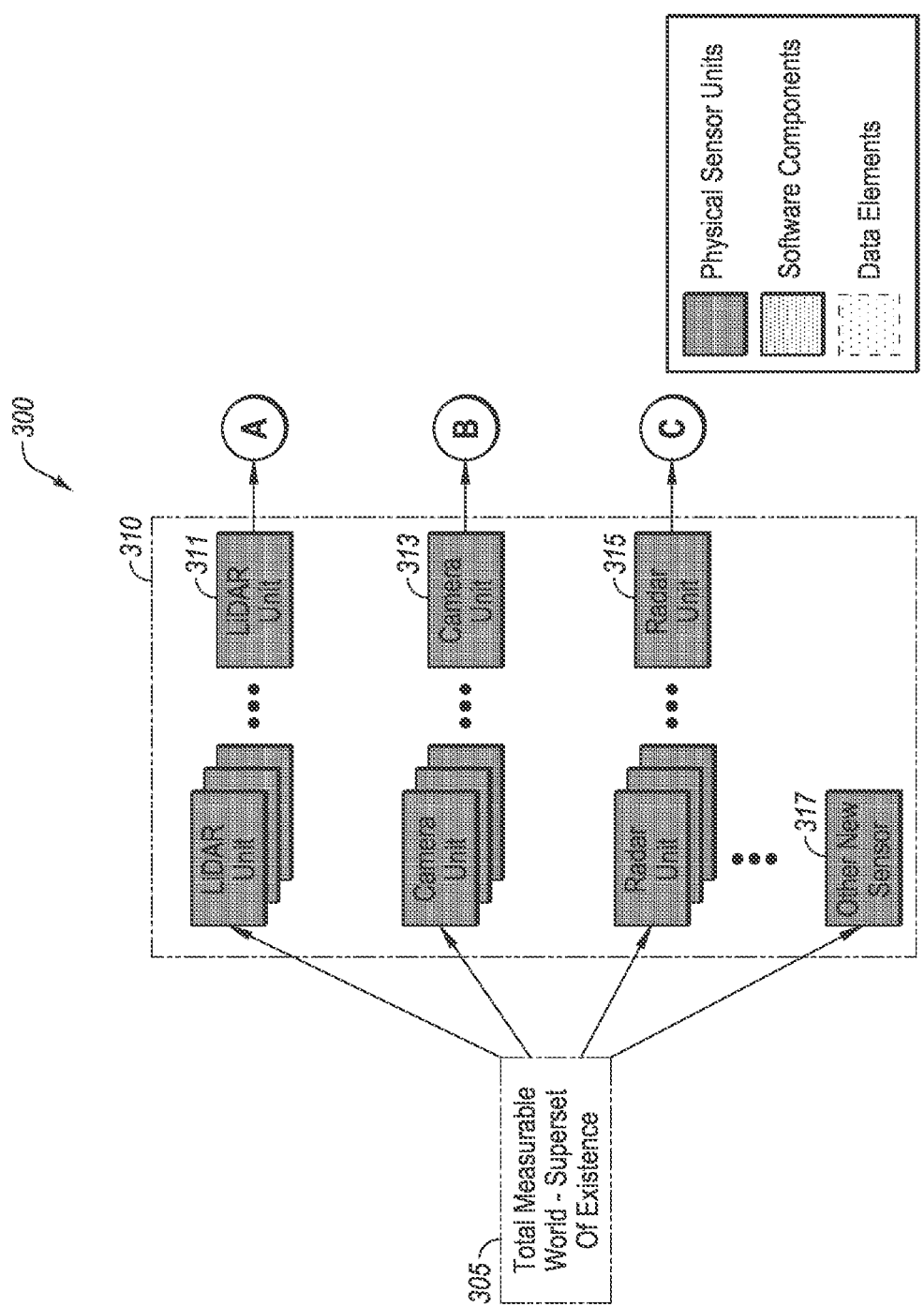

FLEXIBLE MULTI-CHANNEL FUSION PERCEPTION

CROSS-REFERENCES TO RELATED APPLICATIONS

This application claims the benefit of U.S. Patent Application Ser. No. 63/219,729, filed on Jul. 8, 2021, U.S. Patent Application Ser. No. 63/219,731, filed on Jul. 8, 2021, U.S. Patent Application Ser. No. 63/220,886, filed on Jul. 12, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of flexible multi-channel fusion perception.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining first sensor data from a first sensor system and second sensor data from a second sensor system different from the first sensor system. The first sensor system and the second sensor system may capture sensor data from a total measurable world. The method may include identifying a first object included in the first sensor data and a second object included in the second sensor data and determining first parameters corresponding to the first object and second parameters corresponding to the second object. The first parameters may be compared with the second parameters and whether the first object and the second object are a same object may be determined based on the comparing the first parameters and the second parameters. Responsive to determining that the first object and the second object are the same object, a set of objects representative of objects in the total measurable world including the same object may be generated.

In some embodiments, the first sensor system may be a Light Detection and Ranging (LiDAR) sensor system.

In some embodiments, the second sensor system may be a camera sensor system or a radar sensor system.

In some embodiments, identifying the first object included in the first sensor data and the second object included in the second sensor data may include using a regional proposal process that involves comparing one or more characteristics of a given object to corresponding defined characteristics of objects in the total measurable world that are the same as or within a threshold level of similarity to the given object.

In some embodiments, identifying the first object included in the first sensor data may include categorizing the first object as an object or as an obstacle.

In some embodiments, the first parameters corresponding to the first object and the second parameters corresponding to the second object may include a relative position, an orientation, a speed, or an intensity value corresponding to a respective object.

In some embodiments, generating the set of objects representative of objects in the total measurable world may include categorizing the objects as persistent tracks, new tracks, or lost tracks, wherein the set of objects representative of the objects in the total measurable world include the persistent tracks and the new tracks.

According to an aspect of an embodiment, one or more non-transitory computer-readable storage media may be configured to store instructions that, in response to being executed, cause a system to perform operations. The operations may include obtaining first sensor data from a first sensor system and second sensor data from a second sensor system different from the first sensor system. The first sensor system and the second sensor system may capture sensor data from a total measurable world. The method may include identifying a first object included in the first sensor data and a second object included in the second sensor data and determining first parameters corresponding to the first object and second parameters corresponding to the second object. The first parameters may be compared with the second parameters and whether the first object and the second object are a same object may be determined based on the comparing the first parameters and the second parameters. Responsive to determining that the first object and the second object are the same object, a set of objects representative of objects in the total measurable world including the same object may be generated.

In some embodiments, the first sensor system may be a Light Detection and Ranging (LiDAR) sensor system.

In some embodiments, the second sensor system may be a camera sensor system or a radar sensor system.

In some embodiments, identifying the first object included in the first sensor data and the second object included in the second sensor data may include using a regional proposal process that involves comparing one or more characteristics of a given object to corresponding defined characteristics of objects in the total measurable world that are the same as or within a threshold level of similarity to the given object.

In some embodiments, identifying the first object included in the first sensor data may include categorizing the first object as an object or as an obstacle.

In some embodiments, the first parameters corresponding to the first object and the second parameters corresponding to the second object may include a relative position, an orientation, a speed, or an intensity value corresponding to a respective object.

In some embodiments, generating the set of objects representative of objects in the total measurable world may include categorizing the objects as persistent tracks, new tracks, or lost tracks, wherein the set of objects representative of the objects in the total measurable world include the persistent tracks and the new tracks.

According to an aspect of an embodiment, a system may include one or more processors and one or more non-transitory computer-readable storage media configured to store instructions that, in response to being executed, cause the system to perform operations. The operations may include obtaining first sensor data from a first sensor system and second sensor data from a second sensor system different from the first sensor system. The first sensor system and the second sensor system may capture sensor data from a total measurable world. The method may include identifying a first object included in the first sensor data and a second object included in the second sensor data and determining first parameters corresponding to the first object and second parameters corresponding to the second object. The first parameters may be compared with the second parameters and whether the first object and the second object are a same object may be determined based on the comparing the first parameters and the second parameters. Responsive to determining that the first object and the second object are the same object, a set of objects representative of objects in the total measurable world including the same object may be generated.

In some embodiments, the first sensor system may be a Light Detection and Ranging (LiDAR) sensor system.

In some embodiments, the second sensor system may be a camera sensor system or a radar sensor system.

In some embodiments, identifying the first object included in the first sensor data and the second object included in the second sensor data may include using a regional proposal process that involves comparing one or more characteristics of a given object to corresponding defined characteristics of objects in the total measurable world that are the same as or within a threshold level of similarity to the given object.

In some embodiments, identifying the first object included in the first sensor data may include categorizing the first object as an object or as an obstacle.

In some embodiments, the first parameters corresponding to the first object and the second parameters corresponding to the second object may include a relative position, an orientation, a speed, or an intensity value corresponding to a respective object.

In some embodiments, generating the set of objects representative of objects in the total measurable world may include categorizing the objects as persistent tracks, new tracks, or lost tracks, wherein the set of objects representative of the objects in the total measurable world include the persistent tracks and the new tracks.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIGS. 3A, 3B, and 3C, which may be referred to collectively as FIG. 3, illustrate a diagram representing matching and tracking of raw pointclouds and image data of a multi-channel sensor data fusion system according to the present disclosure;

DETAILED DESCRIPTION

The present disclosure relates to a fusion of sensor data, such as raw pointclouds of LiDAR data, image data, and/or radar data, captured from two or more sensor channels to generate a multi-channel fusion perception system. Individual sensor channels may include various advantages and disadvantages and the fusion of sensor data from multiple sensor channels may improve the flexibility and/or adaptability of the perception system by compensating for the disadvantages of any given individual sensor channel, for example, by utilizing the strengths of other types of sensor channels. For example, image-capturing sensors and data channels may capture image data that includes numerous recognizable objects that facilitate object-identification processes. However, determining physical parameters (e.g., position, velocity, and/or acceleration) associated with the objects included in the image data may be more challenging relative to determining such physical parameters associated with the same objects represented by a raw pointcloud of LiDAR data. By fusing multiple sensor channels according to the present disclosure, the computing speed and/or accuracy of object-perception systems for autonomous vehicles may be improved.

Embodiments of the present disclosure will be explained with reference to the accompanying drawings.

Figure 1:
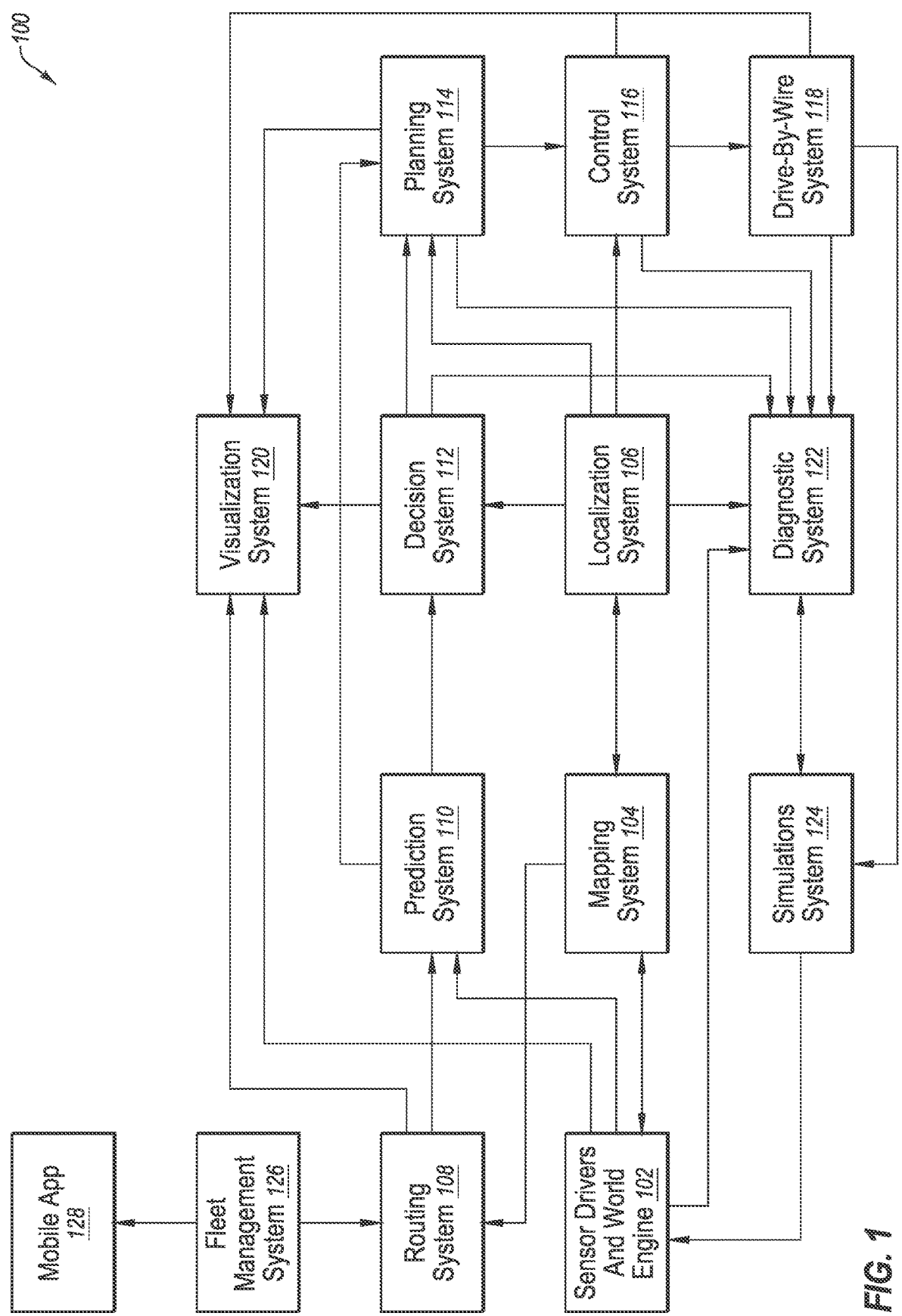
FIG. 1 illustrates an example embodiment of an autonomous driving system according to at least one embodiment of the present disclosure.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2:
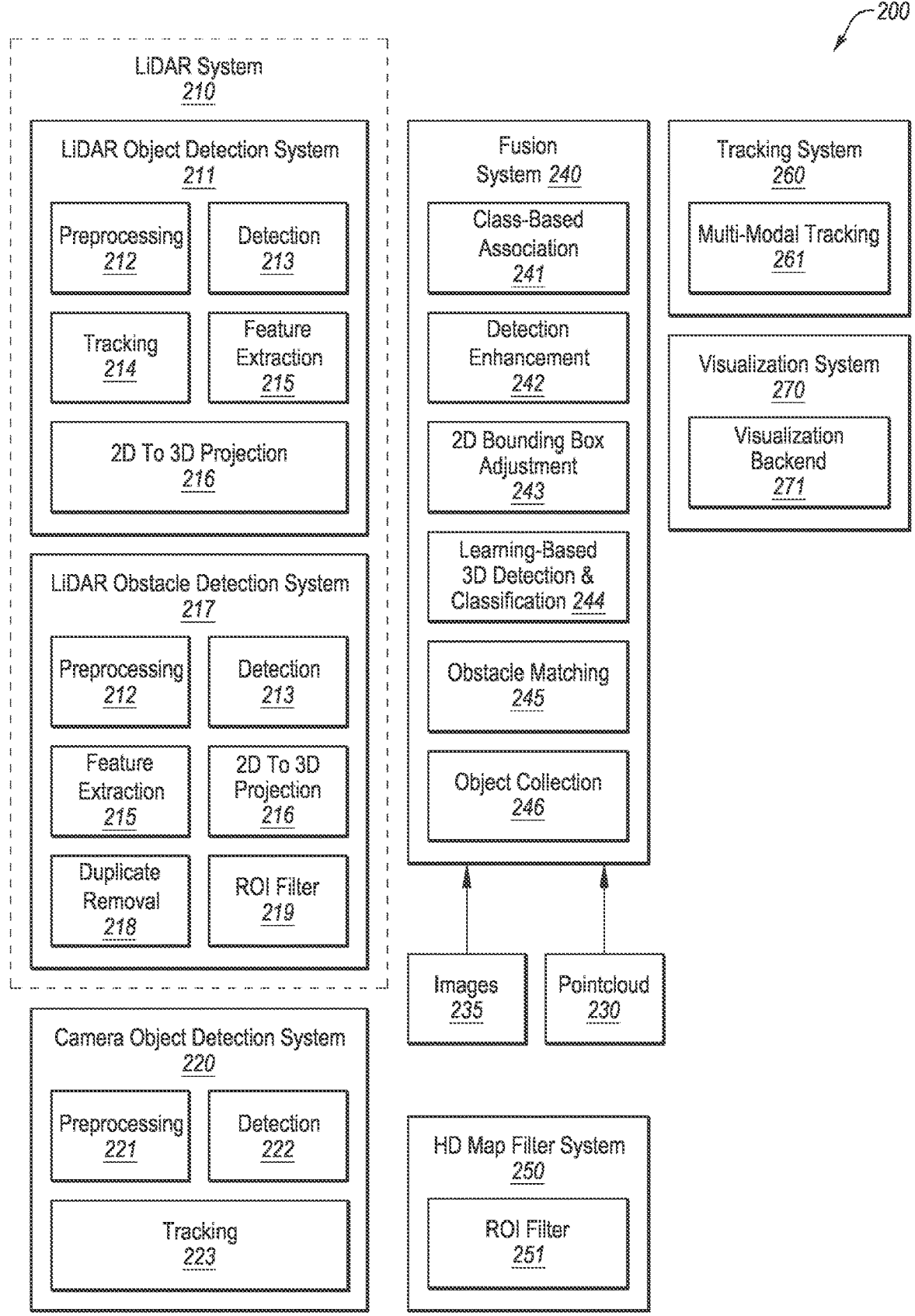
FIG. 2 illustrates a static view of a multi-channel fusion perception system according to the present disclosure.

FIG. 2 illustrates a static view of a multi-channel fusion perception system 200 according to the present disclosure. In some embodiments, the multi-channel fusion perception system 200 may include a LiDAR system 210 configured to capture and process raw pointclouds of LiDAR data, a camera object detection system 220 (e.g., a camera system) configured to capture and process image data, and/or any other number of sensor systems that perceive characteristics of surroundings. The multi-channel fusion perception system may include a fusion system 240 configured to compare LiDAR data 230 (e.g., pointclouds) obtained by the LiDAR system 210, the image data 235, and/or data from other sensor perception systems to identify objects included in a total measurable world from which the LiDAR system 210 and the camera object detection system 220 obtained sensor data.

As illustrated in FIG. 2, the LiDAR system 210 may include a LiDAR object detection system 211 and/or a LiDAR obstacle detection system 217. The LiDAR system 210 may be configured to emit laser beams that may be reflected towards and captured by the LiDAR system 210 upon contacting a surface in the vicinity of the LiDAR system 210. Based on the time elapsed between emission of the original laser beam and reception of the reflected laser beam and/or a comparison of the intensity of the original and the reflected laser beams, a distance between the LiDAR system 210 and the point at which the laser beam was reflected may be calculated. The distances between the LiDAR system 210 and multiple points each corresponding to a reflected laser beam may be compiled as a representation of the environment around the LiDAR system 210. The LiDAR object detection system 211 may include a preprocessing module 212, a detection module 213, a tracking module 214, a feature extraction module 215, and/or a two-dimensional to three-dimensional projection module 216. The LiDAR obstacle detection system 217 may include the preprocessing module 212, the detection module 213, the feature extraction module 215, the two-dimensional to three-dimensional projection module 216, a duplicate removal module 218, and/or a region of interest (ROI) filter module 219. Elements of the LiDAR system 210, including, for example, the preprocessing module 212, the detection module 213, the tracking module 214, the feature extraction module 215, the two-dimensional to three-dimensional projection module 216, the duplicate removal module 218, and/or the ROI filter module 219 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to a total measurable world to output LiDAR data, which may include pointclouds 230.

In some embodiments, the preprocessing module 212, the detection module 213, and the tracking module 214 of the LiDAR object detection system 211 may preprocess the raw pointclouds and perform data tracking over one or more periods of time to identify one or more objects and/or obstacles represented by the raw pointclouds. The preprocessing module 212 may be configured to perform one or more preprocessing operations on captured LiDAR data, which may involve modifying the captured LiDAR data to improve interpretability of the pointclouds 230. For example, the preprocessing module 212 may be configured to filter out noisy data, removing redundant LiDAR data points (e.g., data points corresponding to the same point in the environment), amplifying data points corresponding to weak laser intensities, any other preprocessing operations, or some combination thereof. The tracking module 214 may be configured to identify data points included in the pointclouds 230 that are associated with the same point in the environment around the LiDAR object detection system 211 between two or more frames of LiDAR data. Because the LiDAR object detection system 211 may be moving or objects in the vicinity of the LiDAR object detection system 211 may be in motion, one or more data points captured in both a first frame and a second frame may be associated with the same location and/or the same object. The tracking module 214 may identify the same given data point across multiple frames by, for example, analyzing positional and/or laser intensity relationships between data points, corroborating LiDAR data included in the pointclouds 230 against image data, or some combination thereof.

The feature extraction module 215 of the LiDAR object detection system 211 may extract one or more features from a first frame of LiDAR data (e.g., a first raw pointcloud). The LiDAR object detection system 211 may then extract one or more features from one or more subsequent frames of LiDAR data (e.g., a second raw pointcloud, a third raw pointcloud, and/or a fourth raw pointcloud) and compare the extracted features between the frames of LiDAR data. The LiDAR object detection system 211 may detect and track one or more objects and/or obstacles by comparing the frames of LiDAR data and determining continuity of extracted features between the frames.

In some embodiments, the LiDAR object detection system 211 and/or the LiDAR obstacle detection system 217 may each categorize a given extracted feature as an object and/or an obstacle based on one or more properties of the given extracted feature. In some embodiments, the LiDAR object detection system 211 and/or the LiDAR obstacle detection system 217 may categorize the extracted features according to one or more rules and/or heuristics set by a user and/or learned via a machine-learning process. For example, a given machine learning system may be provided with a training dataset that includes groups of pointcloud data that are labeled as various objects. The given machine learning system may identify patterns, similarities, distinctions, and/or other characteristics included in the groups of pointcloud data to determine heuristic rules for identifying objects included in a set of pointcloud data. For example, the machine learning system may be trained to predict that a first extracted feature from a given set of pointcloud data may be categorized as an object because the position of the first extracted feature moved between the frames of the LiDAR data, and the shape of the first extracted feature in a corresponding raw pointcloud is similar to the shape of raw pointcloud data associated with pedestrians. As another example, a second extracted feature included in the given set of pointcloud data may be predicted to be an obstacle because the position of the second extracted feature is fixed, oscillating, and/or moving within a predetermined range between the frames of the LiDAR data.

In these and other embodiments, the LiDAR object detection system 211 and/or the LiDAR obstacle detection system 217 may perform additional data processing on the given extracted feature based on whether the given extracted feature is identified as an object and/or as an obstacle. For example, a region-of-interest filter ("ROI filter") 219 may be included with the LiDAR obstacle detection system 217 and configured to perform ROI filtering for one or more given regions in the environment around the LIDAR obstacle detection system 217 in which the given extracted feature is identified as an obstacle that is included in the given regions (e.g., a highway barrier). As another example, a duplicate removal module 218 may be included with the LiDAR obstacle detection system 217 and configured to remove duplicate sensor data relating to the given extracted feature based on the given extracted feature being identified as an obstacle (e.g., a highway barrier).

The camera object detection system 220 may include object detection and tracking based on captured image data. In some embodiments, the camera object detection system 220 may include a preprocessing module 221, a detection module 222, and/or a tracking module 223. Elements of the camera object detection system 220, including, for example, the preprocessing module 221, the detection module 222, and/or the tracking module 223 (generally referred to as "computing modules"), may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to a total measurable world to output image data, which may include images 235.

In some embodiments, the preprocessing module 221 and/or the detection module 222 of the camera object detection system 220 may preprocess captured images 235 and perform data tracking over one or more periods of time to identify one or more objects included in the images 235. In some embodiments, the object detection and tracking may be based on a frame-by-frame comparison of the image data 235. Identities of one or more objects may be predicted according to one or more processes, rules, and/or heuristics set by a user and/or learned via a machine-learning process based on information included in the captured image data.

For example, the object detection may be facilitated by a channel-fusion-based object-detection process, such as a region-based convolutional neural network (R-CNN) process. In these and other embodiments, the channel-fusion-based object-detection process may use the visual indicators in the captured images and/or predictive comparison techniques to predict the identities of one or more objects included in the images via an artificial intelligence or machine learning system that is trained on a training dataset that includes labeled object images to identify patterns, similarities, and differences between various labeled object images. After training a machine learning system, pedestrians, streetlamps, buildings, other vehicles, the road, and any other objects or obstacles in the vicinity of the camera object detection system 220 may be predictively identified in the captured images based on heuristic rules learned over the course of training by the machine learning system.

In some embodiments, the tracking module 223 may be configured to track the presence and/or the position of the predicted objects between two or more frames of image data. In some embodiments, the image may be classified (e.g., a list of objects predicted to be included in the image may be generated), one or more instances of objects may be identified and/or located within the image, and/or a location and scale of each object within the image may be identified.

In some embodiments, the fusion system 240 of the multi-channel fusion perception system 200 may be configured to compare the raw pointclouds 230 of the LiDAR system 210 and the images 235 of the camera object detection system 220. The fusion system 240 may include a class-based association module 241, a detection enhancement module 242, a two-dimensional bounding box adjustment module 243, a learning-based three-dimensional detection and classification module 244, an obstacle matching module 245, and/or an object collection module 246. Elements of the fusion system 240, including, for example, the aforementioned computing modules, may include code and routines configured to enable a computing system to perform one or more operations. Additionally or alternatively, the computing modules may be implemented using hardware including a processor, a microprocessor (e.g., to perform or control performance of one or more operations), a field-programmable gate array (FPGA), or an application-specific integrated circuit (ASIC). In some other instances, the computing modules may be implemented using a combination of hardware and software. In the present disclosure, operations described as being performed by the computing modules may include operations that the computing modules may direct one or more corresponding systems to perform. The computing modules may be configured to perform a series of operations with respect to the pointclouds 230 and/or the images 235 to output one or more fused objects.

In some embodiments, the fusion system 240 may obtain labeled objects in the form of images (e.g., in the same or a similar format as the images 235) and/or in the form of LiDAR data (e.g., in the same or a similar format as the pointclouds 230). The fusion system 240 may include a machine learning system that uses the class-based association module 241 to generate one or more class-based rules or heuristics that may facilitate identification of objects in newly obtained images and/or pointclouds. The class-based rules or heuristics may be identified based on similarities, differences, and/or any other patterns between the labeled objects included in a training dataset.

The two-dimensional bounding box adjustment module 243 may be configured to set a frame in which processes relating to predictive object detection may be performed, and the detection enhancement module 242 may be configured to improve the resolution of the images and/or the LiDAR data captured in the frame set by the two-dimensional bounding box adjustment module 243. After setting the frame and enhancing the information included in the frame, the two-dimensional bounding box adjustment module 243 may set a second frame, such as a frame adjacent to the first set frame in which the resolution of the images and/or the LiDAR data were previously set.

The learning-based three-dimensional detection and classification module 244 may be configured to predictively identify objects included in the frame set by the two-dimensional bounding box adjustment module 243. In some embodiments, the learning-based three-dimensional detection and classification module 244 may use the rules and/or heuristics generated by the class-based association module 241 to predictively identify objects represented by groups of data points included in the images (e.g., groups of pixels) and/or the LiDAR data (e.g., groups of pointcloud data points).

In these and the other embodiments, the learning-based three-dimensional detection and classification module 244 may be configured to classify the predictively identified objects as either objects or obstacles. The obstacle matching module 245 may be configured to determine whether a given first obstacle predictively identified and classified in a first frame is the same as or a continuation of a given second obstacle predictively identified and classified in a second frame, where the second frame may come from a different sensor and/or a different sensor type than the first frame (such as a first frame of camera data and a second frame of LiDAR data). In some embodiments, the obstacle matching module 245 may determine whether the given first obstacle and the given second obstacle are the same obstacle by determining whether the given first obstacle and the given second obstacle include the same or similar shapes, orientations, other physical or spatial properties, or some combination thereof. Additionally or alternatively, the obstacle matching module 245 may determine whether the given first obstacle extends through the first frame in which the given first obstacle was predictively identified towards the second frame in which the given second obstacle was predictively identified. In these and other embodiments, the object collection module 246 may be configured to compile the predictively identified objects and/or obstacles, which may be sent to downstream computer systems and/or processes associated with operations of an autonomous vehicle.

In some embodiments, the multi-channel fusion perception system 200 may be configured to interface with and/or connect to one or more computer systems corresponding to a given autonomous vehicle such that operations of the multi-channel fusion perception system 200 and/or of the computer systems may be improved. For example, the multi-channel fusion perception system 200 may connect to a high-definition map filter system 250 that includes a ROI filter module 251 to facilitate ROI filtering. As an additional or alternative example, the multi-channel fusion perception system 200 may connect to a tracking system 260 that includes a multi-modal tracking module 261 and/or a visualization system 270 that includes a visualization backend module 271. The tracking system 260 and/or the visualization system 270 may obtain one or more of the predicted objects from the multi-channel fusion perception system 200 and generate a virtual visualization of the one or more predicted objects relative to the autonomous vehicle to which the multi-channel fusion perception system 200 corresponds.

Modifications, additions, or omissions may be made to the multi-channel fusion perception system 200 without departing from the scope of the present disclosure. For example, the designations of different elements in the manner described is meant to help explain concepts described herein and is not limiting. For instance, in some embodiments, the LiDAR system 210, the camera object detection system 220, the fusion system 240, the high-definition map filter system 250, the tracking system 260, and/or the visualization system 270 are delineated in the specific manner described to help with explaining concepts described herein but such delineation is not meant to be limiting. Further, the multi-channel fusion perception system 200 may include any number of other elements or may be implemented within other systems or contexts than those described.

Figure 3B:
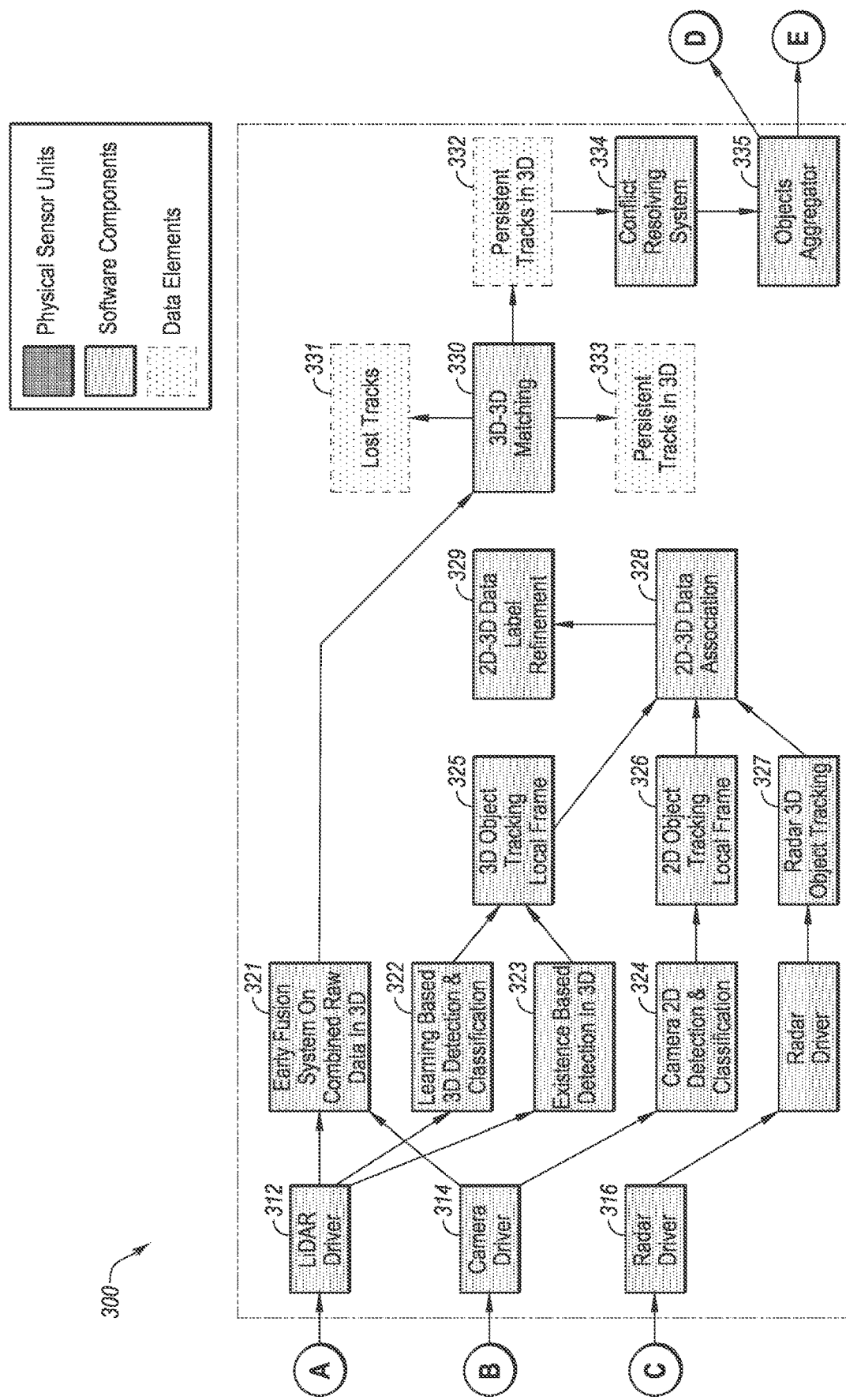
Figure 3C:
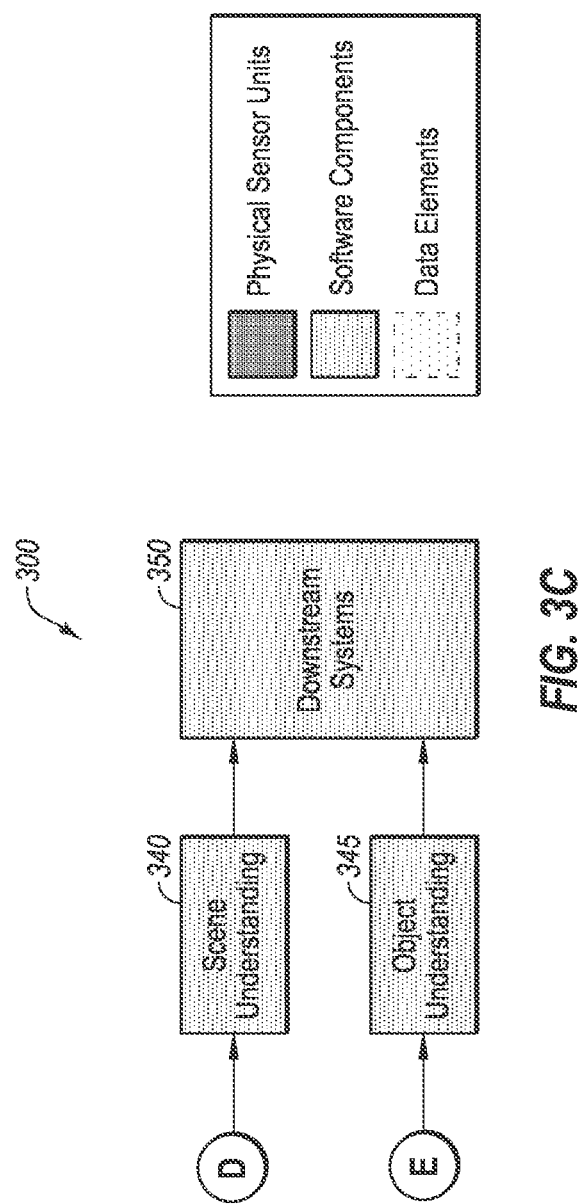

FIG. 3 is a diagram representing matching and tracking of sensor data included in a multi-channel fusion perception system 300 according to the present disclosure. The multi-channel fusion perception system 300 may include a sensor suite 310 that includes one or more LiDAR units 311 and/or one or more camera units 313, which may be the same as or similar to the LiDAR system 210 and the camera object detection system 220, respectively, as described above in relation to FIG. 2. Additionally or alternatively, the sensor suite 310 of the multi-channel fusion perception system 300 may include one or more radar sensors 315 configured to capture radar data, which may be compared to the raw pointclouds captured by the LiDAR units 311 and/or the image data captured by the camera units 313. Additionally or alternatively, the multi-channel fusion perception system 300 may include sensor data captured from any other sensors and/or data-capturing units 317, such as imaging radar and/or vehicle-to-everything ("V2X") data from roadside V2X units. Although operations of the multi-channel fusion perception system 300 are described in relation to the LiDAR units 311, the camera units 313, and the radar units 315, other sensor systems 317 and/or sensor data may be included in the operations of the multi-channel fusion perception system 300 in the same or a similar manner as the LiDAR units 311, the camera units 313, and/or the radar units 315.

The LiDAR units 311, the camera units 313, and/or the radar units 315 may be coupled to a LiDAR driver 312, a camera driver 314, and/or a radar driver 316 (collectively "the drivers"), respectively, in which the drivers are configured to send information from the LiDAR units 311, the camera units 313, the radar units 315, and/or any other sensor systems 317 to one or more computer systems and/or software modules associated with the multi-channel fusion perception system 300. For example, the sensor data may be sent to an early fusion module 321, a learning-based three-dimensional detection and classification module 322, a three-dimensional, existence-based detection module 323, a two-dimensional camera detection and classification module 324, a three-dimensional object-tracking local frame module 325, a two-dimensional object-tracking local frame module 326, a three-dimensional radar object-tracking module 327, a data association module 328, a label refinement module 329, a 3D-to-3D matching module 330, a conflict-resolving module 334, an object aggregator 335, and/or any other computer systems or modules. Additionally or alternatively, the drivers may be configured to perform preprocessing of the sensor data captured by the respective LiDAR units 311, camera units 313, radar units 315, and/or other sensor systems 317. For example, the drivers may perform transformations on the sensor data, compensate for environmental factors and/or sensor calibration, time-synchronize the sensor data, and/or filter noise from the sensor data. More specifically, the drivers may be configured to perform dark-area enhancement for processing image data, filtering of weather particles (e.g., rain, snow, and/or hail conditions), cut-off measurements of a body attached to the sensor units, or any other sensor data processing.

The early fusion module 321 may be configured to perform processing of the images and LiDAR data at a fine granularity level. In some embodiments, processing the obtained sensor data may involve predictive detection of one or more data points included in the sensor data at a three-dimensional and point-wise level. For example, a given data point may be analyzed by the early fusion module 321 to assess whether the given data point is likely associated with an object, an obstacle, and/or a background detail. In this and other examples, the early fusion module 321 may perform data filtering to remove the given data point from further analysis if the given data point appears to be related to background details or if the given data point appears to be noisy data. A data point that is predictively identified as being part of an object or an obstacle may be clustered together with other data points that were predictively identified as being part of the same object or the same obstacle to facilitate object-level detection.

In some embodiments the early-fusion process may include processing the image data, the LiDAR data, and/or the radar data to determine one or more parameters associated with the objects included in the image data, the objects included in the LiDAR data, and/or the objects included in the radar data, respectively. Such parameters may include position, velocity, acceleration, etc. of a given data point. The parameters associated with the image data, the LiDAR data, and/or the radar data may be compared to identify matching data points that are detected in all three datasets. Additionally or alternatively, the parameters associated with the image data, the LiDAR data, and/or the radar data may be compared to identify matching data points that are detected in at least two of the datasets. For example, each of the detected data points may be assigned a tracking identifier, and parameters (e.g., the position, the velocity, the acceleration, etc.) may be calculated for each of the data points assigned tracking identifiers over two or more frames. In this and other examples, the parameters may be compared to determine whether a first data point detected in the LiDAR data is the same (or similar within a parameter threshold) as a second data point detected in the image data such that an association may be made between the tracking identifier of the first data point (of the LiDAR data) and the tracking identifier of the second data point (of the image data).

In some embodiments, the object-level detection of the data points may involve operations of the learning-based three-dimensional detection and classification module 322, the three-dimensional, existence-based detection module 323, the two-dimensional camera detection and classification module 324, the three-dimensional object-tracking local frame module 325, the two-dimensional object-tracking local frame module 326, and/or the three-dimensional radar object-tracking module 327. In these and other embodiments, the learning-based three-dimensional detection and classification module 322, the three-dimensional, existence-based detection module 323, the two-dimensional camera detection and classification module 324, the three-dimensional object-tracking local frame module 325, the two-dimensional object-tracking local frame module 326 and/or the three-dimensional radar object-tracking module 327 may perform operations that are the same as or similar to the operations of the fusion system 240 as described in relation to FIG. 2 to fuse the sensor data obtained from different sensor sources and predictively identify one or more objects and/or obstacles in the vicinity of the autonomous vehicle.

For example, the learning-based three-dimensional detection and classification module 322 may be configured to detect groupings of LiDAR data and classify the detected groups of LiDAR data as particular objects and/or obstacles using a machine-learning process that identifies patterns in the LiDAR data to detect the groupings of the LiDAR data. The three-dimensional, existence-based detection module 323 may be configured to provide an additional or an alternative process by which the object and/or obstacles included in the LiDAR data may be identified. For example, the three-dimensional existence-based detection module 323 may be configured to detect objects and/or obstacles included in the LiDAR data using rules and/or heuristics that relate to object and/or obstacle identification in LiDAR data as set by an analyzing user. The two-dimensional camera detection and classification module 324 may be configured to detect and classify objects and/or obstacles included in one or more frames of image data captured by the camera units 313. The three-dimensional object-tracking local frame module 325 may be configured to take the three-dimensional LiDAR data analyzed by the learning-based three-dimensional detection and classification module 322 and/or the three-dimensional, existence-based detection module 324 and generate a three-dimensional local frame based on that information, and the two-dimensional object-tracking local frame module 326 may be configured to generate a local frame based on the two-dimensional image data provided by the two-dimensional camera detection and classification module 324. The three-dimensional radar object-tracking module 327 may be configured to analyze radar data provided by the radar units 315 to track motion of one or more objects and/or obstacles.

To facilitate comparison of the objects included in the LiDAR data, the image data, the radar data, and/or any other forms of sensor data, three-dimensional representations of the environment corresponding to some forms of the sensor data (e.g., the LiDAR data and/or the radar data) may be converted into two-dimensional representations of the same environment for comparison with the two-dimensional image data to facilitate data association and/or label refinement between objects (e.g., by the data association module 328 and/or the label refinement module 329). Additionally or alternatively, the two-dimensional representations of the environment included in the image data may be converted into three-dimensional representations of the same environment for comparison with the LIDAR data and/or the radar data.

In some embodiments, the object-level detection of the data points may involve a regional proposal process in which the computer modules 322-327 are given one or more rules, guidelines, or other heuristics regarding how particular objects and/or obstacles are supposed to appear in the real world. For example, an object identified as a pedestrian is supposed to be less than six meters tall and less than three meters wide after adjusting for variances in human body builds, data collection inaccuracies, and any other real-world or computer-system considerations. In this and other examples, an object that does not satisfy a threshold level of similarity relating to pedestrians may be predicted to be some other type of object (e.g., a tree or a vehicle). Additionally or alternatively, the computer modules 322-327 may be configured to identify a center of a group of data points that potentially represent an object or an obstacle and apply object and/or obstacle-identification processes starting from the identified center of the group of data points.

Differences and similarities between the sensor data processed by the various computer modules 322-327 may be obtained by the data association module 328 and the label refinement module 329, which may associate the processed two-dimensional data captured by one or more sensor systems (e.g., image data) with the processed three-dimensional data captured by other sensor systems (e.g., LiDAR and radar data). Associating the two-dimensional data and the three-dimensional data may facilitate matching between the same object identified in the two-dimensional data and the three-dimensional data. Additionally or alternatively, associating the two-dimensional data and the three-dimensional data may facilitate predictive identification of previously unidentified objects due to insufficient data resolution present in either the two-dimensional data or the three-dimensional data alone.

The associated two-dimensional data and three-dimensional data may be sent to the 3D-to-3D matching module 330, which may be configured to generate and/or update a set of three-dimensional objects and obstacles. In some embodiments, the set of three-dimensional objects and obstacles may include lost tracks 331, persistent tracks 332, and/or new tracks 333. The 3D-to-3D matching module 330 may be configured to categorize the data obtained from the label refinement module 329 and/or from the early fusion module 321 as persistent tracks 332 responsive to the obtained data being consistent with existing three-dimensional objects and/or obstacles included in the set. Additionally or alternatively, any matched objects identified in the early-fusion process may be categorized as part of the persistent tracks 332, and operations of the 3D-to-3D matching module 330 may not be applied to the matched objects identified by the early fusion module 321. Objects and/or obstacles identified by the 3D-to-3D matching module 330 may be categorized as new tracks 333 responsive to the obtained data not being present in the persistent tracks 332. Any objects and/or obstacles that were previously present in the persistent tracks 332 but are not included in the data obtained from the label refinement module 329 and/or the early fusion module 321 may be categorized as lost tracks 331. Additionally or alternatively, one or more predictively identified objects that are present in a single sensor dataset that do not correspond to objects detected by other sensor channels may be categorized as lost tracks.

In these and other embodiments, one or more objects of a first type of sensor data may be identified as providing more accurate data than objects of other types of sensor data included in the multi-channel fusion perception system 300. For example, data included in the LiDAR data representative of objects that are not matched to objects included in the image data and/or the radar data during the early-matching process and/or the 3D-to-3D matching process may be categorized as new tracks, while objects included in the image data that are not matched during the early-matching process and/or the 3D-to-3D matching process may be categorized as lost tracks. In some embodiments, the treatment of different sensor data may be based on the designated quality of the respective sensor data. For example, if the LiDAR data is considered more accurate than the image data, the LiDAR-detected objects may be categorized as new tracks based on its superior accuracy while the image-detected objects may be categorized as lost tracks based on its inferior accuracy.

Figure 4:
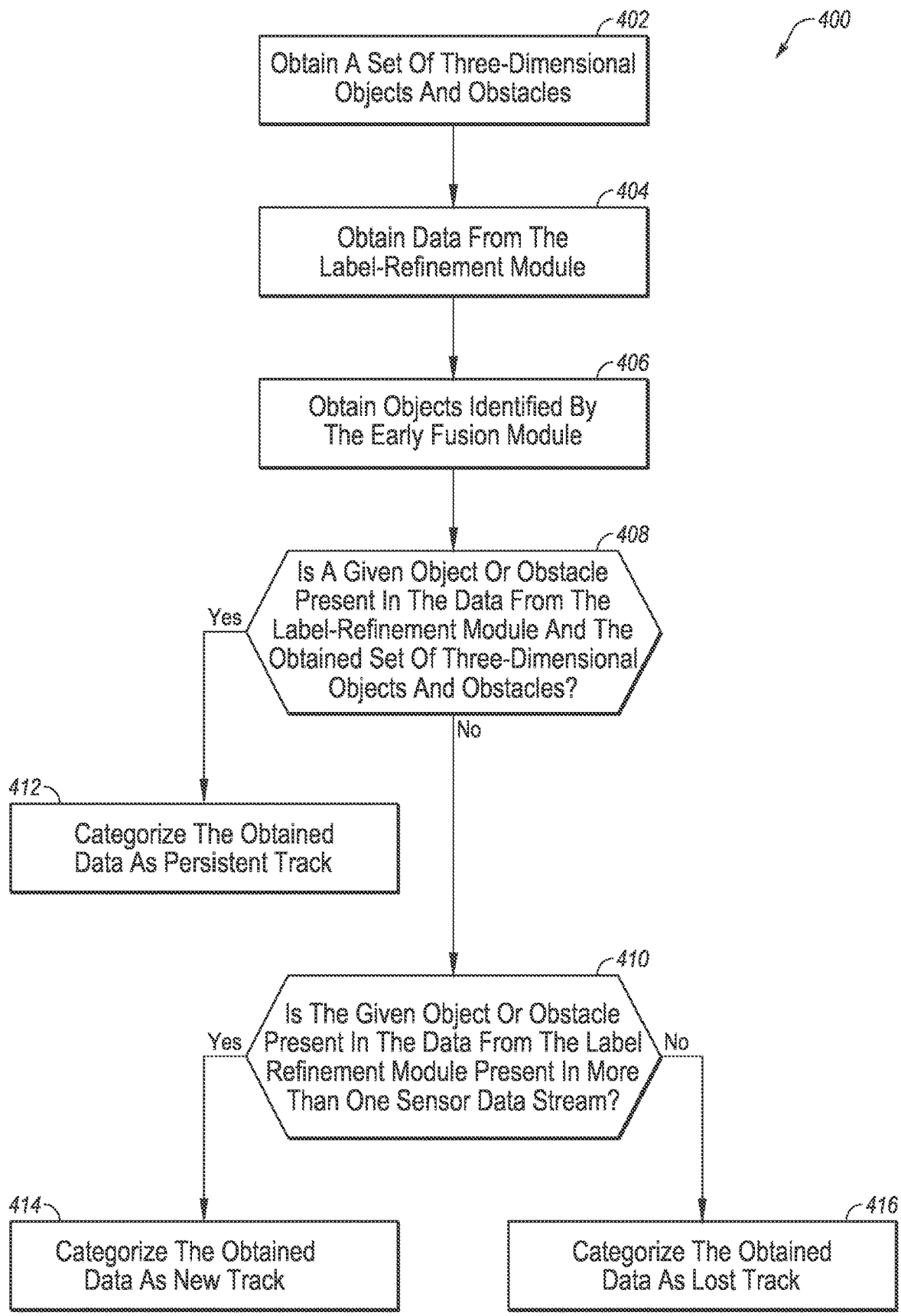
FIG. 4 is a flowchart of an example method of categorizing objects and obstacles according to at least one embodiment of the present disclosure.

FIG. 4 is a flowchart of an example method 400 of categorizing objects and obstacles as the persistent tracks 332, the new tracks 333, or the lost tracks 331 according to at least one embodiment of the present disclosure. The method 400 may be performed by any suitable system, apparatus, or device. For example, the multi-channel fusion perception system 200 of FIG. 2 and/or the multi-channel fusion perception system 300 of FIG. 3 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a set of three-dimensional objects and obstacles is obtained. In some embodiments, the set of three-dimensional objects and obstacles may include objects and obstacles previously provided by an early fusion process, such as performed by the early fusion module 321, and/or objects and obstacles previously provided by the label-refinement module 329. For example, the set of three-dimensional objects and obstacles may include objects and obstacles captured in previous frames by the early fusion process and/or the label-refinement module 329.

At block 404, data from the label-refinement module 329 may be obtained. In some embodiments, the data from the label-refinement module 329 may include the categorization of the objects and obstacles obtained at block 402 as lost tracks, persistent tracks, or new tracks, such as described in relation to FIG. 3.

At block 406, objects identified by the early fusion module 321 may be obtained. In some embodiments, the objects identified by the early fusion module may be categorized as persistent tracks without comparison of the objects identified by the early fusion module 321 to the set of three-dimensional objects and obstacles and/or the data obtained from the label-refinement module 329. The objects identified at a later step in the process after the operations of the early fusion module 321 may be analyzed as described in relation to block 408.

At block 408, whether a given object and/or obstacle is present in the data from the label-refinement module obtained at block 404 and in the set of three-dimensional objects and obstacles obtained at block 402 may be determined. Responsive to determining that the given object and/or obstacle is present in both the label-refinement module data and the set of three-dimensional objects and obstacles, the method 400 may proceed to block 412, where the given object and/or obstacle is categorized as part of the persistent track.

Responsive to determining that the given object and/or obstacle is only present in either the label-refinement module data or the set of three-dimensional objects and obstacles, the method 400 may proceed to block 410, where it may be determined whether the given object and/or obstacle is present in more than one sensor data stream. Responsive to determining that the given object and/or obstacle is present in more than one sensor data stream, the method 400 may proceed to block 414, where the given object and/or obstacle is categorized as part of the new track. Responsive to determining that the given object and/or obstacle is only present in one sensor data stream, the method may proceed to block 416, where the given object and/or obstacle is categorized as part of the lost track. In some embodiments, one or more of the sensor data streams may be weighted more heavily than other sensor data streams such that the method 400 may proceed to block 414 and the given object and/or obstacle may be categorized as part of the new track even if the given object and/or obstacle is only present in one sensor data stream.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Returning to the description of FIG. 3, a conflict-resolving module 334 may be configured to compare the persistent tracks 332, the new tracks 333, and/or any other information provided by the 3D-to-3D matching module 330 to resolve inconsistencies, duplications, or any other conflicts between the data. The conflict-resolving module 334 may resolve inconsistencies in the identified matched objects, and the results of the conflict-resolving process may include one or more matched objects being included as a set of objects representative of a total measurable world. The conflict-resolving module 334 may then send the object and/or obstacle data to the object aggregator 335, which may compile the obtained data.

In some embodiments, the aggregated objects compiled by the object aggregator 335 may be sent to a scene understanding module 340 and/or an object understanding module 345. The scene understanding module 340 and/or the object understanding module 345 may provide interpretations of an environment in which the autonomous vehicle is operating and/or of the objects and obstacles, which may be used by one or more downstream systems 350. For example, the scene understanding module 340 may determine that an autonomous vehicle is operating on a busy downtown street, a rural highway, within a warehouse, etc. based on the detected objects and/or obstacles. As another example, the object understanding module 345 may determine that the objects include a series of construction cones near the autonomous vehicle, or other information or understanding regarding the objects.

Modifications, additions, or omissions may be made to the multi-channel perception fusion system 300 without departing from the scope of the present disclosure. For example, the designations of different elements in the manner described is meant to help explain concepts described herein and is not limiting. For instance, in some embodiments, the early fusion module 321, the learning-based three-dimensional detection and classification module 322, the three-dimensional, the existence-based detection module 323, the two-dimensional camera detection and classification module 324, the three-dimensional object-tracking local frame module 325, the two-dimensional object-tracking local frame module 326, the three-dimensional radar object-tracking module 327, the data association module 328, the label refinement module 329, the 3D-to-3D matching module 330, the conflict-resolving module 334, and the object aggregator 335 are delineated in the specific manner described to help with explaining concepts described herein but such delineation is not meant to be limiting. Further, the multi-channel perception fusion system 300 may include any number of other elements or may be implemented within other systems or contexts than those described.

Figure 5:
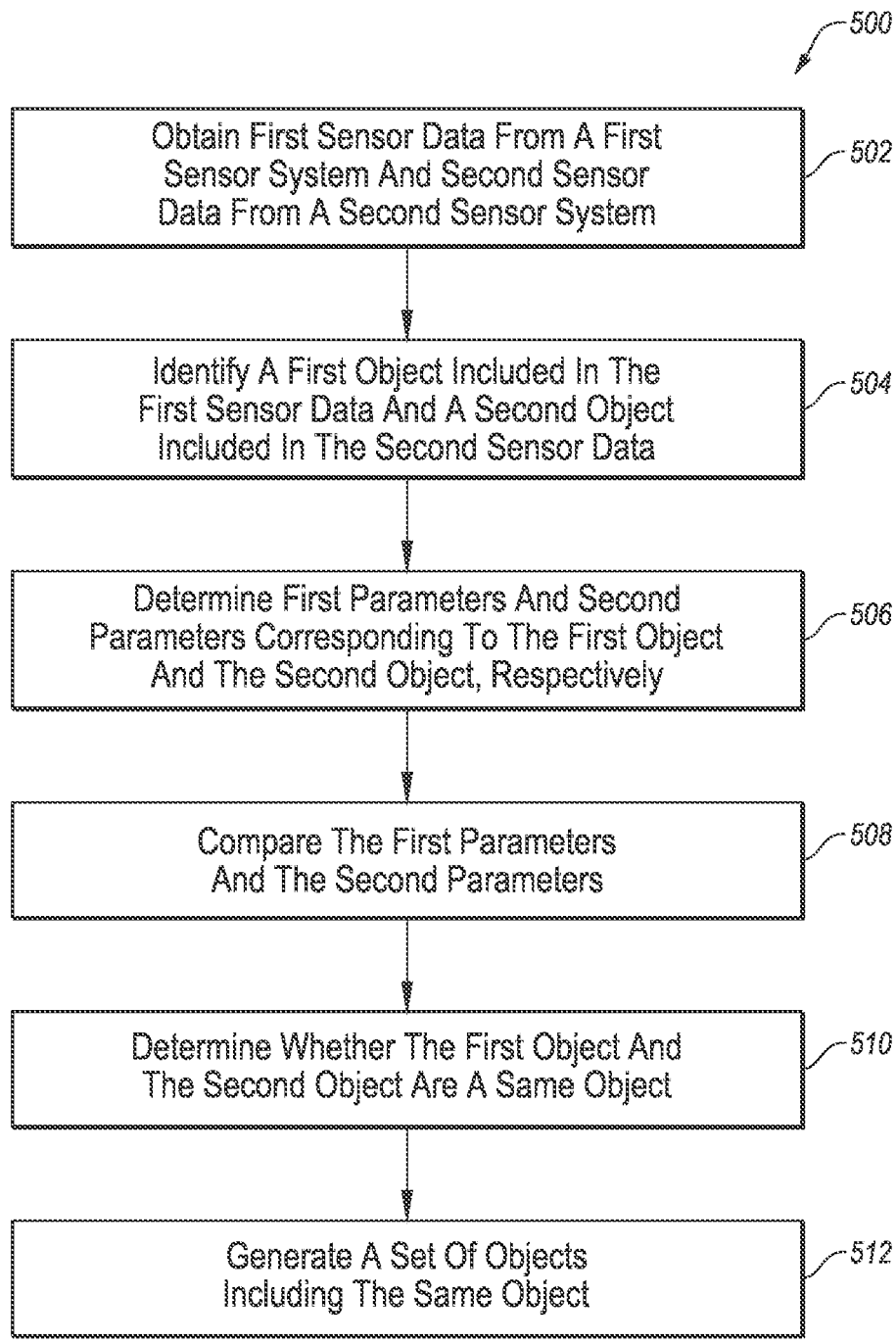
FIG. 5 is a flowchart of an example method of performing multi-channel perception fusion according to at least one embodiment of the present disclosure.

FIG. 5 is a flowchart of an example method 500 of performing multi-channel perception fusion according to at least one embodiment of the present disclosure. The method 500 may be performed by any suitable system, apparatus, or device. For example, the multi-channel fusion perception system 200 of FIG. 2 and/or the multi-channel fusion perception system 300 of FIG. 3 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where first sensor data from a first sensor system and second sensor data from a second sensor system are obtained. In some embodiments, the first sensor system and the second sensor system may include LiDAR sensor systems, camera sensor systems, radar sensor systems, or any other sensor systems that are configured to capture sensor data relating to a total measurable world in the vicinity of an autonomous vehicle.

At block 504, a first object included in the first sensor data and a second object included in the second sensor data may be identified. Identification of the first object and the second object may be facilitated by various object-detection processes, such as those involving the LiDAR object detection system 211, the LiDAR obstacle detection system 217, and/or the camera object detection system 220 as described in relation to the multi-channel fusion perception system 200 of FIG. 2. In some embodiments, identifying the first object and/or the second object may involve using a regional proposal process that uses information regarding how objects are supposed to appear in the total measurable world to provide initial guesses of the identities of the first object and/or the second object.

At block 506, first parameters corresponding to the first object and second parameters corresponding to the second object may be determined. In some embodiments, the first parameters and the second parameters may include intrinsic and/or extrinsic properties of the objects, such as a relative position, an orientation, a speed, or an intensity value corresponding to the objects.

At block 508, the first parameters and the second parameters may be compared. Such a comparison may be a simple comparison of any differences or similarities between the parameters, or may include a more detailed comparison such as a weighted difference across multiple parameters, where different parameters are given different weights and/or different distances from the same values are given different weights.

At block 510, whether the first object and the second object are a same object may be determined based on the comparison of the first parameters and the second parameters at block 508. The first object and the second object may be the same object responsive to the first parameters and the second parameters being the same or similar within a threshold level because the first object and the second object were identified from different sensor data streams relating to the same frame of reference. Consequently, two objects included in different sensor data streams may be the same object if the two objects display similar extrinsic properties or include similar intrinsic properties.

At block 512, a set of objects, including the same object determined at the block 510, may be generated responsive to determining that the first object and the second object are the same object. The set of objects may represent objects and/or obstacles in the vicinity of the autonomous vehicle in the total measurable world. In some embodiments, the set of objects may be sent to one or more downstream processes for further processing to facilitate one or more operations of the autonomous vehicle. In some embodiments, the addition of the same object to a new or existing set may qualify as generating a set of objects, and block 512 may additionally or alternatively involve including new objects in existing sets of objects.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
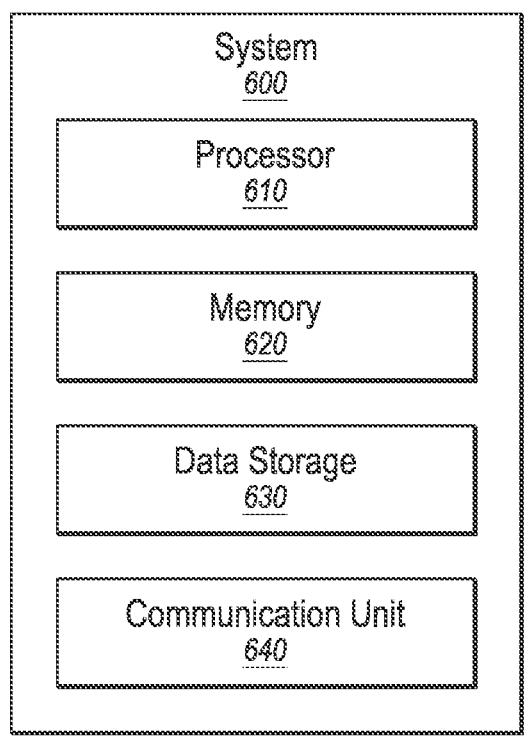
FIG. 6 is an example computing system.

FIG. 6 illustrates an example computing system 600, according to at least one embodiment described in the present disclosure. The computing system 600 may include a processor 610, a memory 620, a data storage 630, and/or a communication unit 640, which all may be communicatively coupled. Any or all of the multi-channel fusion perception system 200 and/or the multi-channel fusion perception system 300 of FIGS. 2 and/or 3, respectively, may be implemented as a computing system consistent with the computing system 600.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform operations associated with the method 400 of FIG. 4 and/or the method 500 of FIG. 5. For example, the instructions may relate to performing operations associated with obtaining the first sensor data and the second sensor data, identifying the first object and the second object, determining the first parameters and the second parameters, comparing the first parameters and the second parameters, determining whether the first object and the second object are the same object, and/or generating the set of objects including the same object according to the method 500.

The memory 620 and the data storage 630 may include computer-readable storage media or one or more computer-readable storage mediums for having computer-executable instructions or data structures stored thereon. Such computer-readable storage media may be any available media that may be accessed by a general-purpose or special-purpose computer, such as the processor 610. For example, the memory 620 and/or the data storage 630 may store obtained raw pointclouds, image data, and/or radar data. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 640 may permit data to be exchanged with a network and/or any other devices or systems described in the present disclosure. For example, the communication unit 640 may allow the system 600 to communicate with other systems, such as computing devices and/or other networks.

One skilled in the art, after reviewing this disclosure, may recognize that modifications, additions, or omissions may be made to the system 600 without departing from the scope of the present disclosure. For example, the system 600 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    obtaining first sensor data from a first sensor system and second sensor data from a second sensor system of a different type from the first sensor system, the first sensor system and the second sensor system respectively capturing the first sensor data and the second sensor data from an environment in which an autonomous vehicle operates;
    predicting an identity of a first object included in the first sensor data and an identity of a second object included in the second sensor data using a regional proposal process that includes comparing expected physical properties of an object expected to be included in the environment to a physical property of the first object and a physical property of the second object;
    determining one or more first parameters corresponding to the first object and one or more second parameters corresponding to the second object, each of the first parameters and the second parameters indicating physical properties including at least shape and orientation of a respective object;

comparing the first parameters and the second parameters to determine similarity between the physical properties of the first object and the second object;

determining the first object and the second object are a same object based on the comparing the first parameters and the second parameters indicating that the first object and the second object are similar within a threshold value; and responsive to determining that the first object and the second object are the same object, including the same object in a set of objects representative of objects in the environment.

2. The method of claim 1, wherein the first sensor system is a Light Detection and Ranging (LiDAR) sensor system.

3. The method of claim 1, wherein the second sensor system is a camera sensor system or a radar sensor system.

4. The method of claim 1, wherein identifying the first object included in the first sensor data includes categorizing the first object as an object or as an obstacle.

5. The method of claim 1, wherein the first parameters corresponding to the first object and the second parameters corresponding to the second object include a relative position, an orientation, a speed, or an intensity value corresponding to a respective object.

6. The method of claim 1, further comprising categorizing the same object as a persistent track object, a new track object, or a lost track object, wherein the same object is included in the set of objects responsive to the same object being categorized as the persistent track object or as the new track object.

7. One or more non-transitory computer-readable storage media configured to store instructions that, in response to being executed, cause a system to perform operations, the operations comprising:

obtaining first sensor data from a first sensor system and second sensor data from a second sensor system of a different type from the first sensor system, the first sensor system and the second sensor system respectively capturing the first sensor data and the second sensor data from an environment in which an autonomous vehicle operates;

predicting an identity of a first object included in the first sensor data and an identity of a second object included in the second sensor data using a regional proposal process that includes comparing expected physical properties of an object expected to be included in the environment to a physical property of the first object and a physical property of the second object;

determining one or more first parameters corresponding to the first object and one or more second parameters corresponding to the second object, each of the first parameters and the second parameters indicating physical properties including at least shape and orientation of a respective object;

comparing the first parameters and the second parameters to determine similarity between the physical properties of the first object and the second object;

determining the first object and the second object are a same object based on the comparing the first parameters and the second parameters indicating that the first object and the second object are similar within a threshold value; and responsive to determining that the first object and the second object are the same object, including the same object in a set of objects representative of objects in the environment.

8. The one or more non-transitory computer-readable storage media of claim 7, wherein the first sensor system is a Light Detection and Ranging (LiDAR) sensor system.

9. The one or more non-transitory computer-readable storage media of claim 7, wherein the second sensor system is a camera sensor system or a radar sensor system.

10. The one or more non-transitory computer-readable storage media of claim 7, wherein identifying the first object included in the first sensor data includes categorizing the first object as an object or as an obstacle.

11. The one or more non-transitory computer-readable storage media of claim 7, wherein the first parameters corresponding to the first object and the second parameters corresponding to the second object include a relative position, an orientation, a speed, or an intensity value corresponding to a respective object.

12. The one or more non-transitory computer-readable storage media of claim 7, further comprising categorizing the same object as a persistent track object, a new track object, or a lost track object, wherein the same object is included in the set of objects responsive to the same object being categorized as the persistent track object or as the new track object.

13. A system comprising:

one or more processors; and one or more non-transitory computer-readable storage media configured to store instructions that, in response to being executed, cause the system to perform operations, the operations comprising:

obtaining first sensor data from a first sensor system and second sensor data from a second sensor system of a different type from the first sensor system, the first sensor system and the second sensor system respectively capturing the first sensor data and the second sensor data from an environment in which an autonomous vehicle operates;

predicting an identity of a first object included in the first sensor data and an identity of a second object included in the second sensor data using a regional proposal process that includes comparing expected physical properties of an object expected to be included in the environment to a physical property of the first object and a physical property of the second object;

determining one or more first parameters corresponding to the first object and one or more second parameters corresponding to the second object, each of the first parameters and the second parameters indicating physical properties including at least shape and orientation of a respective object;

comparing the first parameters and the second parameters to determine similarity between the physical properties of the first object and the second object;

determining the first object and the second object are a same object based on the comparing the first parameters and the second parameters indicating that the first object and the second object are similar within a threshold value; and responsive to determining that the first object and the second object are the same object, including the same object in a set of objects representative of objects in the environment.

14. The system of claim 13, wherein the first sensor system is a Light Detection and Ranging (LiDAR) sensor system.

15. The system of claim 13, wherein identifying the first object included in the first sensor data includes categorizing the first object as an object or as an obstacle.

16. The system of claim 13, wherein the first parameters corresponding to the first object and the second parameters corresponding to the second object include a relative position, an orientation, a speed, or an intensity value corresponding to a respective object.

17. The system of claim 13, further comprising categorizing the same object as a persistent track object, a new track object, or a lost track object, wherein the same object is included in the set of objects responsive to the same object being categorized as the persistent track object or as the new track object.

\* \* \* \* \*